US 7,788,469 B2

(12) United States Patent
Yamada et al.

(10) Patent No.: US 7,788,469 B2
(45) Date of Patent: Aug. 31, 2010

(54) INFORMATION PROCESSING DEVICE HAVING ARRANGEMENTS TO INHIBIT COPROCESSOR UPON ENCOUNTERING DATA THAT THE COPROCESSOR CANNOT HANDLE

(75) Inventors: Tetsuya Yamada, Tokyo (JP); Naohiko Irie, Tokyo (JP); Takahiro Irita, Tokyo (JP); Masayuki Kabasawa, Yokohama (JP)

(73) Assignee: Renesas Technology Corp., Tokyo (JP)

( * ) Notice: Subject to any disclaimer, the term of this patent is extended or adjusted under 35 U.S.C. 154(b) by 47 days.

(21) Appl. No.: 10/883,758

(22) Filed: Jul. 6, 2004

(65) Prior Publication Data

US 2005/0027965 A1 Feb. 3, 2005

(30) Foreign Application Priority Data

Jul. 7, 2003 (JP) ............................. 2003-192600
Jun. 3, 2004 (JP) ............................. 2004-165435

(51) Int. Cl.
*G06F 15/76* (2006.01)
(52) U.S. Cl. .............. 712/34; 712/E9.068; 712/E9.037; 712/31; 712/222; 712/42
(58) Field of Classification Search ................... 712/31, 712/34, 42, 209, 222, 221, E9.068, E9.037
See application file for complete search history.

(56) References Cited

U.S. PATENT DOCUMENTS 5,485,624 A * 1/1996 Steinmetz et al. ............. 712/34
6,163,835 A * 12/2000 Todd et al. .................... 712/34
6,330,658 B1 * 12/2001 Evoy et al. .................... 712/31
6,332,215 B1 12/2001 Patel et al.

(Continued)

FOREIGN PATENT DOCUMENTS

GB 2376099 A 12/2002

(Continued)

OTHER PUBLICATIONS

ARM Processor Core Documentation "ARM9EJ-S Revision r1p2 Technical Reference Manual" issued Sep. 30, 2002.*

(Continued)

*Primary Examiner*—Eddie P Chan
*Assistant Examiner*—Idriss N Alrobaye
(74) *Attorney, Agent, or Firm*—Antonelli, Terry, Stout & Kraus, LLP.

(57) ABSTRACT

A hardware accelerator is used to execute a floating-point byte-code in an information processing device. For a floating-point byte-code, a byte-code accelerator BCA feeds an instruction stream for using a FPU to a CPU. When the FPU is used, first the data is transferred to the FPU register from a general-purpose register, and then an FPU operation is performed. For data, such as a denormalized number, that cannot be processed by the FPU, in order to call a floating-point math library of software, the processing of the BCA is completed and the processing moves to processing by software. In order to realize this, data on a data transfer bus from the CPU to the FPU is snooped by the hardware accelerator, and a cancel request is signaled to the CPU to inhibit execution of the FPU operation when corresponding data is detected in a data checking part.

8 Claims, 10 Drawing Sheets

U.S. PATENT DOCUMENTS

| | | |
|---|---|---|
| 6,347,344 B1 * | 2/2002 | Baker et al. .................... 710/20 |
| 6,754,804 B1 * | 6/2004 | Hudepohl et al. ............. 712/34 |
| 6,832,117 B1 | 12/2004 | Miyamori |
| 2002/0013892 A1 * | 1/2002 | Gorishek et al. ............ 712/227 |
| 2002/0049894 A1 * | 4/2002 | Moyer et al. .................. 712/34 |
| 2002/0108103 A1 * | 8/2002 | Nevill ........................ 717/139 |
| 2002/0129225 A1 * | 9/2002 | Lindwer ..................... 712/227 |
| 2002/0188825 A1 * | 12/2002 | Seal et al. ................... 712/209 |
| 2003/0009651 A1 * | 1/2003 | Najam et al. .................. 712/34 |
| 2005/0216701 A1 * | 9/2005 | Taylor ......................... 712/34 |

FOREIGN PATENT DOCUMENTS

| | | |
|---|---|---|
| WO | WO 02/097613 A1 | 12/2002 |

OTHER PUBLICATIONS

ARM Processor Core Documentation "VFP9-S Vector Floating-Point Coprocessor Technical Reference manual" issued Apr. 12, 2002.*

* cited by examiner

| Single | NaN | Denorm |
|---|---|---|
| | 7F80_0001—7FFF_FFFF | 0000_0001—007F_FFFF |
| | FF80_0001—FFFF_FFFF | 8000_0001—807F_FFFF |

FIG. 5

Double

| NaN | Denorm |
|---|---|
| 7FF0_0000_0000_0001— | 0000_0000_0000_0001— |
| 7FFF_FFFF_FFFF_FFFF | 000F_FFFF_FFFF_FFFF |
| FFF0_0000_0000_0001— | 8000_0000_0000_0001— |
| FFFF_FFFF_FFFF_FFFF | 800F_FFFF_FFFF_FFFF |

FIG. 6

FPU

| FADD | FRn, DRn | | | | | | |
|---|---|---|---|---|---|---|---|
| FRm, DRm | NORM | +0 | -0 | +INF | -INF | qNaN | sNaN |
| NORM | FADD | | | | | | |
| +0 | | +0 | | | | | |
| -0 | | | -0 | | -INF | | |
| +INF | | | | +INF | Invalid | | |
| -INF | | | | -INF | Invalid | -INF | |
| qNaN | | | | | | qNaN | |
| sNaN | | | | | | | Invalid |

FIG. 7

BCA+FPU

| FADD | FRn, DRn | | | | | | |
|---|---|---|---|---|---|---|---|
| FRm, DRm | NORM | DENORM | +0 | -0 | +INF | -INF | NaN |
| NORM | FADD | | | | | -INF | |
| DENORM | | | | | | | |
| +0 | | | +0 | | | | |
| -0 | | | | -0 | | | |
| +INF | | | | | +INF | qNaN | |
| -INF | -INF | | | | qNan | -INF | |
| NaN | | | | | | | Unsupport |

Not signal ⎯ Unsupport by data check

INFORMATION PROCESSING DEVICE HAVING ARRANGEMENTS TO INHIBIT COPROCESSOR UPON ENCOUNTERING DATA THAT THE COPROCESSOR CANNOT HANDLE

CLAIM OF PRIORITY

The present application claims priority from Japanese application JP 2003-192600, filed Jul. 7, 2003, and Japanese application JP 2004-165435, filed Jun. 3, 2004, the contents of which are hereby incorporated by reference into this application.

FIELD OF THE INVENTION

This invention relates to a semiconductor integrated circuit of the type used in a microprocessor, especially to an information processing device equipped with a hardware accelerator for translating a specified intermediate language into a native instruction of the microprocessor.

BACKGROUND OF THE INVENTION

In recent years, Java that does not depend on platforms, such as specific hardware and an OS, and which can operate in various devices, has become prevalent, from large servers to cellular phones. Java is an object-oriented programming language similar to C++ developed by Sun Microsystems, Inc., and "Java" is a registered trademark of Sun Microsystems, Inc. in the United States and other countries.

In Java, when being compiled, a source code is translated into an intermediate language called a byte-code that is independent of platforms. The byte-code that is interpreted to a native code inherent in the microprocessor using software called a Java virtual machine (VM). By preparing the Java virtual machine corresponding to a platform, the Java virtual machine accommodates differences in platforms.

Execution of the byte-code in the Java virtual machine is a low speed process because the byte-code is interpreted and processed one by one by the interpreter method. Because of this fact, in order to reduce the overhead associated with an interpreter processing loop, translation of the byte-code into a native code is executed using hardware for a frequently used byte-code, thus achieving high speed processing. For example, the below-listed patent document 1 discloses hardware for translating a byte-code into a native code of the microprocessor. Java-based systems are configured to process rarely used byte-codes using a software Java virtual machine.

In this context, there is a CLDC (Connected limited device configuration) as one of the assumed execution environments (configurations) defined in J2ME, which is a Java language specification for built in devices. CLDC is directed at small portable apparatuses and cellular phones, and its supporting virtual machine is KVM.

In CLDC1.1, the floating-point byte-code was added to the object byte-codes. In order to execute a floating-point byte-code with hardware, the use of a FPU becomes necessary. The below-listed patent document 2 discloses hardware that uses a FPU (Floating-point processing unit) to translate a floating-point byte-code into an FPU instruction.

[Patent Document 1]
U.S. Pat. No. 6,332,215 specification
[Patent document 2]
British Patent Application Laid-open No. 2376099 specification In this specification, hardware for translating a stack-based byte-code into a register-based native code will be called a byte-code accelerator. In this byte-code accelerator, the upper element of an operand stack maintained in each frame of Java can be copied to a part of the general-purpose register of the CPU. By reusing the value of the register, the stack-based load and store instructions can be reduced. In this case, for example, when the FPU accepts an instruction code from the CPU and operates as a coprocessor of the CPU, the byte-code accelerator feeds an FPU instruction to the CPU for the floating-point byte-code, and the CPU makes the FPU conduct an operation. If the arithmetic register of the FPU is made a target of the stack, as with the general-purpose register of a CPU, it is necessary for the byte-code accelerator to consider the consistency of data between the general-purpose register of the CPU and the arithmetic register of the FPU, which is likely to complicate the data management of the stack.

Moreover, data that cannot be handled by the FPU exists among the floating-point data. For example, such data is data of an operation on a NaN (Not-a-Number) as input etc. In the patent document 2, in the case of the data that the VFP (FPU) cannot handle, the VFP generates a VFP exception, and the CPU emulates a VFP operation in a VFP exception handler. Then, the CPU determines that an instruction having caused a VFP (FPU) exception is actually a VFP instruction by checking the status register of VPU. There is a case where the floating-point which has having caused the occurrence of an exception cannot be grasped correctly because of imprecise exception signaling. This requires provision of an exception handler that can cope with both a case where detection of the floating-point operation is correct and a case where the detection is inaccurate.

SUMMARY OF THE INVENTION

One of the objects of this invention is to improve the execution efficiency of a virtual machine instruction in a data processing device that has both an accelerator capable of translating a virtual machine instruction into a native instruction and a main processor to execute it using a coprocessor.

More specifically, first, this invention intends to provide an information processing device that can simplify the management of an operand stack for the main processor with a CPU and for the coprocessor, such as a FPU.

Second, this invention intends to provide an information processing device that is capable of correctly detecting an arithmetic operation that the coprocessor, such as a FPU, cannot handle even when an accelerator is used.

Third, this invention intends to provide an information processing device that can use an exception handler for an arithmetic operation that the coprocessor, such as a FPU, cannot handle, without modifying the exception handler even when the accelerator is used.

Both of the above-mentioned objects and other objects and novel features of this invention will be clarified by the description provided in this specification and attached drawings.

A brief explanation of typical examples of the invention disclosed in the present application is as follows.

[1] The information processing device according to this invention, that is devised with a view toward stack management, comprises a main processor, a coprocessor connected to the main processor, and an accelerator that is capable of translating virtual machine instructions, included in an instruction set different from native instructions that the main processor can execute, into native instructions of the main processor. The accelerator translates a virtual machine instruction into a native instruction for an arithmetic operation that the coprocessor executes and a native instruction for moving register to register processing that the main processor executes. The main processor executes the native instruction for moving processing register to register, before making the coprocessor execute the native instruction for the arithmetic operation. By the above-mentioned process, an arithmetic operand of the coprocessor is transferred from a register like a general-purpose register of the main processor to a register like an arithmetic register of the coprocessor by the main processor executing a native instruction for moving the operand register to register. In short, the accelerator uses a register like the arithmetic register of the coprocessor as if it is a temporary register. In other words, the management of an operand stack can be unified to the registers of the main processor by eliminating the registers of the coprocessor, whereby the management of an operand stack by the accelerator can be simplified.

As a concrete form of this invention, the native instruction for moving processing register to register is a data transfer instruction of transferring data from a register file of the main processor to the register file of the coprocessor via a data bus.

The accelerator sets the general-purpose register of the main processor as an object of the operand stack, and sets the arithmetic register of the coprocessor as a non-object of the operand stack.

As a concrete form of this invention, the information processing device is further equipped with memory connected to the main processor, and the main processor comprises: an instruction fetch part for taking in a virtual machine instruction and a native instruction from the memory; a decoder part for decoding the native instruction; and a selection circuit that, when the instruction taken in the instruction fetch part is a virtual machine instruction, selects the output of the accelerator, and when the instruction taken in the instruction fetch part is a native instruction, selects the output of the instruction fetch part.

The accelerator has a simulated pipeline having, for example, the same number of stages as the number of stages of the pipeline included in the main processor.

The virtual machine instruction, for example, is a Java byte-code.

[2] The information processing device according to this invention that, has the objective of eliminating a need for modification of the exception handler for arithmetic operations etc. comprises a main processor, a coprocessor connected to the main processor via a data bus, and an accelerator capable of translating a virtual machine instruction independent of the architecture of the main processor into a native instruction of the main processor. The accelerator checks whether or not data inputted into the coprocessor is unsupported data of the coprocessor, and, if it is unsupported data, the accelerator will inhibit the coprocessor from executing the arithmetic operation or from storing an operation result. In response to such inhibition, the main processor moves to software processing of an operation on the unsupported data. The accelerator conducts a data check on the data to be inputted into the coprocessor before its operation, and the accelerator correctly detects an arithmetic operation that the coprocessor cannot handle before the coprocessor detects an exception. Since the accelerator always correctly grasps whether or not the coprocessor causes an exception, it is not necessary to prepare the exception handler for the possibility that the accelerator inaccurately grasps the coprocessor exception.

As a concrete form of this invention, the accelerator translates a virtual machine instruction for performing a data operation using the coprocessor into a native instruction for an operation that the coprocessor executes and a native instruction for data transfer that the main processor executes, and provides them to the main processor. The main processor executes the native instruction for data transfer before making the coprocessor execute the native *instruction for arithmetic operation. As mentioned above, this process can simplify the management of an operand stack by the accelerator.

In this occasion, it is desirable that the accelerator checks whether the coprocessor can or can not handle data being transferred from the main processor to the coprocessor. Thereby, it can be ensured that the device correctly detects an arithmetic operation that cannot be handled before it is executed.

The accelerator may check whether the coprocessor can or can not handle by data that is being transferred from the memory to the coprocessor.

In the case where the main processor executes an instruction by pipeline processing, a simulated pipeline part may be adopted in order to grasp data check timing. That is, the accelerator possesses a simulated pipeline part, which has register means for performing a shift operation of flag information in response to transition of a pipeline stage of the main processor in order to simulate the pipeline of the main processor, thereby a shift location of the flag information can be referred to.

[3] A concept devised in light of the above two standpoints will be expressed in a different form. The information processing device comprises: an instruction translation logic unit for translating an instruction in the first format into an instruction in the second format; a main processor that fetches instructions in the first format and in the second format, supplies the fetched instruction in the first format to the instruction translation logic unit, decodes the instruction in the second format that was translated in the instruction translation logic unit and the fetched instruction in the second format, and performs arithmetic processing based on the decoded results; a coprocessor for decoding the instruction in the second format received from the main processor and for performing arithmetic processing based on a decoded result; and a data bus for connecting the main processor and the coprocessor. The instructions in the second format include an instruction for performing an operation using the coprocessor and instructions to perform data transfer from the main processor to the coprocessor via the data bus. The coprocessor executes an instruction in the second format for performing an arithmetic operation after the data transfer.

For example, the instruction in the second format may be a native instruction dependent on the main processor, and the instruction in the first format may be a virtual machine instruction independent of the main processor.

The instruction translation logic unit (accelerator) has a data check circuit for receiving data on the data bus and comparing it with a predetermined numeric value; and, when the comparison result produced by the data check circuit indicates agreement, it outputs an inhibit signal for inhibiting execution of the second coprocessor to the main processor. The instruction translation logic unit (accelerator) has a simulated pipeline part for simulating a pipeline of the main processor, and it determines the input timing of the data to be compared in the data check circuit using the simulated pipeline part.

An information processing system using the above-mentioned information processing device is, for example, equipped with an antenna, a first information processing device for encoding and decoding a signal between itself and the antenna, a first main storage connected to the first information processing device, and a second information processing device having connecting means for connecting with both the information processing device according to the invention described above and the first information processing device. The first information processing device stores a program described with a native instruction or virtual machine instruction received through the antenna in the first main storage. The second information processing device reads and executes the program stored in the first main storage.

BRIEF DESCRIPTION OF THE DRAWINGS

FIG. 5 is a diagram showing double precision (Double) data of Not-a-Numbers (NaNs) and denormalized numbers (DENORMs) as data that must be checked in the data check part (DATA_CHK);

FIG. 6 is a diagram showing a matrix for an input operand of a floating-point instruction FADD with FPU exception enable;

FIG. 7 is a diagram showing a matrix for an input operand of a floating-point instruction FADD with FPU exception disable when using the byte-code accelerator;

DETAILED DESCRIPTION OF THE PREFERRED EMBODIMENTS

Figure 1:
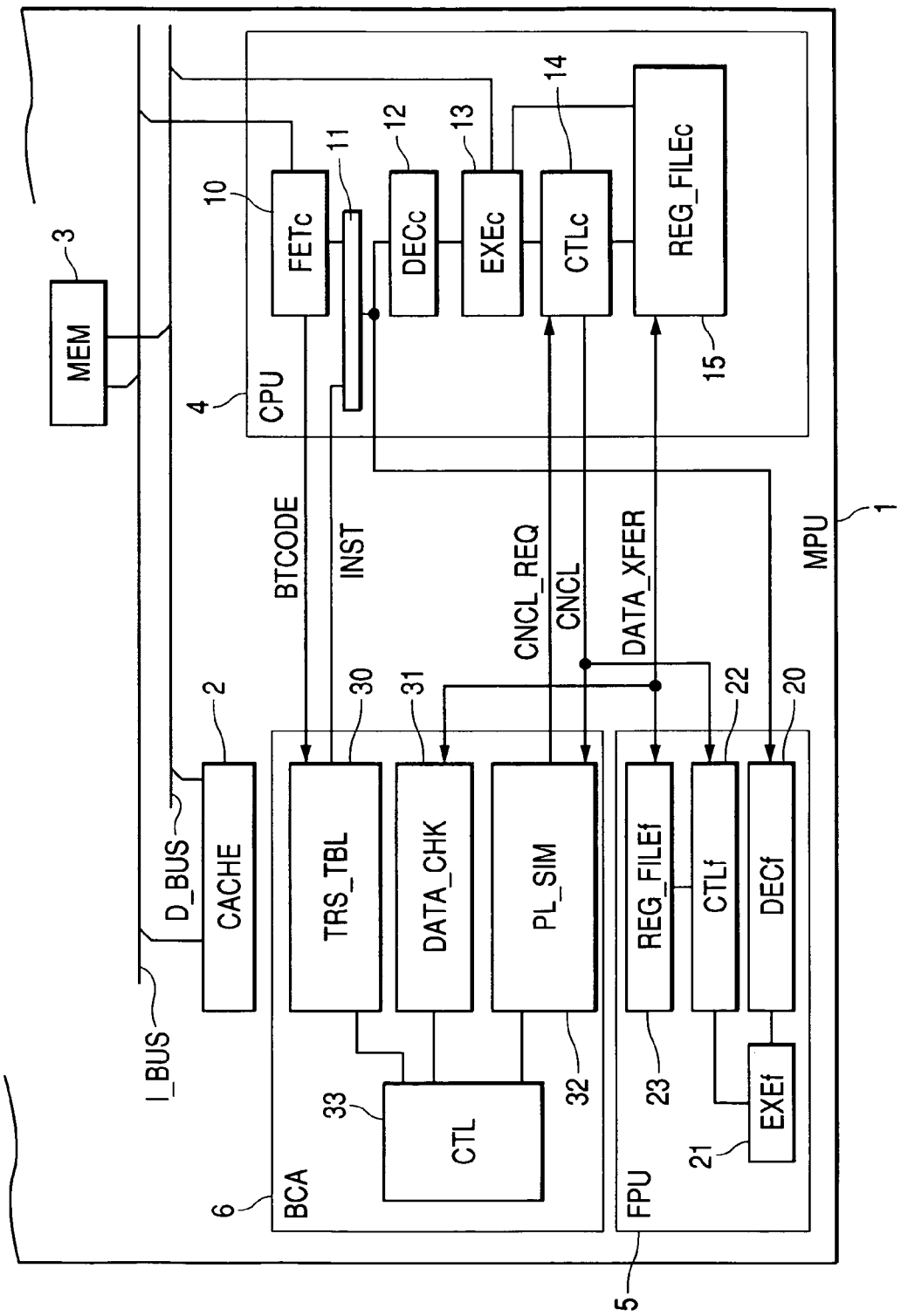
FIG. 1 is a block diagram showing a substantial part of the microprocessor according to one example of this invention.

A substantial part of the microprocessor according to one example of this invention is shown in FIG. 1. The microprocessor (MPU) 1 shown in the figure, although the invention is not limited in particular, is formed on one sheet of semiconductor substrate, such as a substrate formed of monocrystalline silicon, by known semiconductor integrated circuit technology for forming CMOS (complementary MOS transistor), bipolar transistors, etc.

The microprocessor (MPU) 1 has a cache (CACHE) 2, a memory (MEM) 3, a central processing unit (CPU) 4 operating as a main processor, a floating-point processing unit (FPU) 5 acting as a coprocessor, and a byte-code accelerator (BCA) 6, all of which are shown typically.

The central processing unit (CPU) 4 is connected with the cache (CACHE) 2 via an instruction bus I_BUS, a data bus D_BUS, etc. The central processing unit (CPU) 4 is composed of an instruction fetch part (FETc) 10 for fetching an instruction from the memory (MEM) 3 etc., a selector 11, a decoder part (DECc) 12 for decoding an instruction, an instruction execution part (EXEc) 13 for performing an arithmetic operation and execution of the instruction based on a result of the instruction decoding, a control part (CTLc) 14 for generating a control signal, and a register file (GREG_FILEc) 15.

The floating-point processing unit (FPU) 5 is composed of a decoder part (DECf) 20 for decoding an instruction (coprocessor instruction) received from the central processing unit (CPU) 4, an instruction execution part (EXEf) 21 for performing an arithmetic operation and execution of a floating-point instruction based on a result of the instruction decoding, a control part (CTLf) 22 for generating a control signal, and a register file (FREG_FILEf) 23. Moreover, although not shown in the figure, the floating-point processing unit (FPU) 5 is connected with the data bus D_BUS and can also exchange data between itself and the memory (MEM) 3. Especially when a FPU instruction that is a native code is inputted, the floating-point processing unit (FPU) 5 directly accesses the memory (MEM) 3.

The byte-code accelerator (BCA) 6 is composed of a byte-code translation table (TRS_TBL) 30 for translating a byte-code into a native code, a data check part (DATA_CHK) 31 for simultaneously snooping and checking the data of a register transfer between the central processing unit (CPU) 4 and the floating-point processing unit (FPU) 5, a simulated pipeline part (PL_SIM) 32 for simulating a pipeline operation of the central processing unit (CPU) 4, and a control part (CTL) 33 for controlling these elements totally. The byte-code is a virtual machine instruction independent of the architecture of the central processing unit (CPU) 4, for example, a Java byte-code. The native code is a native instruction dependent on the architecture of the central processing unit (CPU) 4. In this embodiment, both a virtual machine instruction and native instruction are stored in the memory (MEM) 3.

Although the invention is not restricted in particular, the register file (REG_FILEc) 15 of the central processing unit (CPU) 4 includes sixteen general-purpose registers, the register file (REG_FILEf) 23 of the floating-point processing unit (FPU) 5 includes sixteen floating-point registers (general-purpose registers), and the register for the CPU 4 and the registers for the FPU 5 are denoted by R0 to R15 and FR0 to FR15, respectively.

Figure 2:
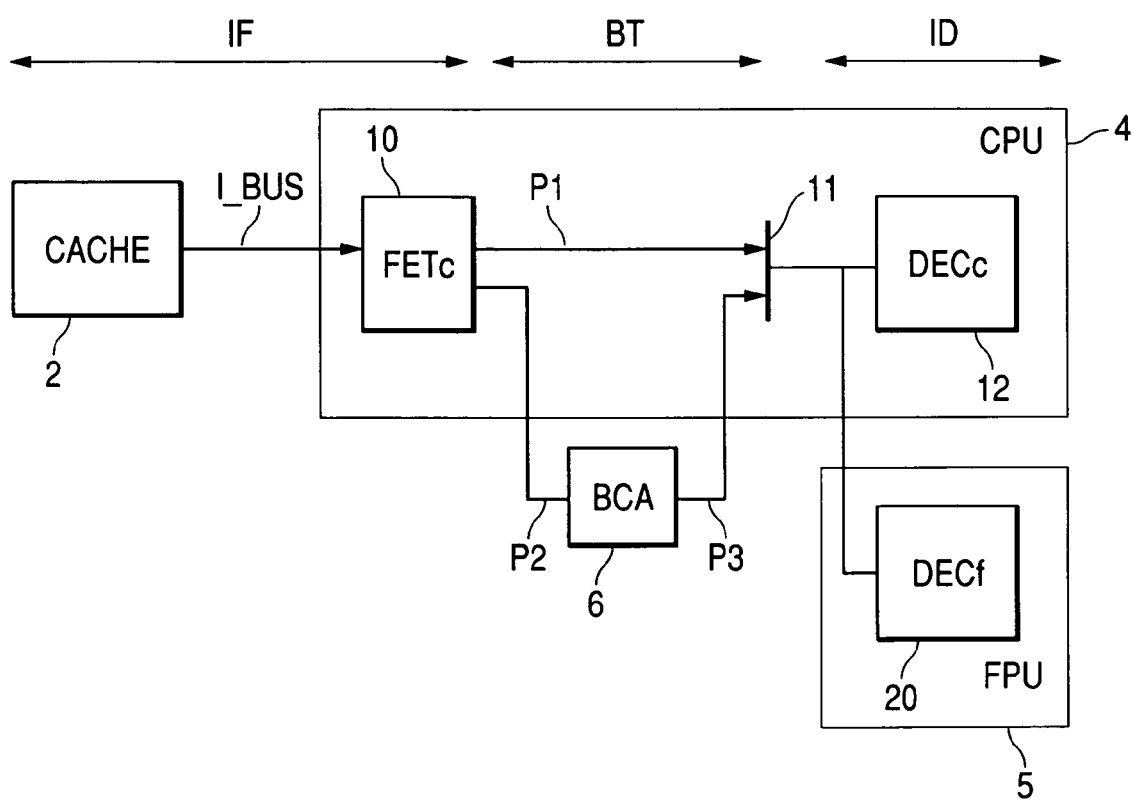
FIG. 2 is a block diagram showing an instruction transmission path from an instruction fetch part (FETc) to a decoder part (DECc, DECf)

FIG. 2 shows an example of the instruction transmission paths from the instruction fetch part (FETc) 10 to the decoder parts (DECc, DECf) 12, 20. The native code fetched by the instruction fetch part (FETc) 10 passes through a path P1. If the instruction fetched by the instruction fetch part (FETc) 10 is a byte-code, the byte-code is fed to the byte-code accelerator (BCA) 6 through a path P2, and the native code obtained here by translation is outputted to a path P3. Paths P1, P3 are selected by a selector 11, and either of them is connected to the decoder parts (DECc, DECf) 12, 20. The selector 11 selects the path P3 in response to starting of the byte-code accelerator (BCA) 6. The decoder part (DECc) 12 decodes all instructions to generate a control signal. The decoder part (DECf) 20 recognizes and decodes a floating-point instruction. The CPU 4 performs addressing to an address space. Therefore, the central processing unit (CPU) 4 performs addressing to the floating-point operation code accompanied by a memory access. When the central processing unit (CPU) 4 processes a byte-code, it executes a predetermined branch instruction for starting the byte-code accelerator (BCA) 6 and changes the value of a program counter PC of the central processing unit (CPU) 4 to a byte-code address (JavaPC) in a byte-code area. Thereby, the program counter (PC) of the central processing unit (CPU) 4 functions as a JavaPC for fetching a byte-code. In order to return from the processing of a byte-code, the central processing unit (CPU) 4 just has to execute a predetermined branch instruction.

Here, the main functions of the byte-code accelerator (BCA) 6 will be described. The first function is the instruction translation function described above. BTCODE means a byte-code, and INST means a native code. Especially for the floating-point byte-code accompanied by a floating-point operation, the byte-code accelerator (BCA) 6 translates it into a native code for operation that the floating-point processing unit 5 executes (floating-point operation native code) and a native instruction for moving data register to register that the central processing unit 4 executes, and it feeds them to the central processing unit 4. The floating-point operation native code obtained by translation is not accompanied by memory access as an addressing mode. The addressing mode is register-specified, more specifically, directly register-specified to the floating-point register, although the invention is not limited in particular. On an operand of the floating-point operation, the central processing unit 4 executes the native code for moving data register to register obtained by translation, and transfers the data from the general-purpose register 15 of the central processing unit 4 to the floating-point register 23 of the floating-point processing unit 5 via a data bus DATA_XFER. An operation result of the transferred data is transferred from the register file (REG_FILEf) 23 of the floating-point processing unit 5 to the register file (REG_FILEc) 15 of the central processing unit 4.

The second function is a data check function. The data check function means a function of checking whether or not data is data that the floating-point processing unit cannot handle (hereinafter referred to as "operation-unsupported data"). The data that the floating-point processing unit cannot handle is data when the input data is a denormalized number for hardware having no processing logic of a denormalized number and data when the input data is Not-a-Number (NaN). Details of each type of data will be described later.

The byte-code accelerator 6 judges whether or not the data being transferred via the data bus DATA_XFER is operation-unsupported data (data that is not supported for operation) for the floating-point processing unit 5. If it is operation-unsupported data, in order to inhibit the floating-point processing unit 5 from executing the operation code, the byte-code accelerator 6 sends a cancel request to the central processing unit 4 by a signal CNCL_REQ. In response to this, the central processing unit 4 outputs a cancel signal CNCL to the floating-point processing unit 5 and the byte-code accelerator 6. By this operation, operation on the operation-unsupported data by the floating-point processing unit 5 is inhibited. The byte-code accelerator 6 to which a cancel was directed deactivates the operation (DEACT) in order to process the canceled operation on the operation-unsupported data with software. Such a software program is a part of the software VM (virtual machine). The software VM program is stored in the memory (MEM) 3.

The above-mentioned functions will be described in more detail. First, an operation for execution of the integer byte-code by a microprocessor (MPU) 1 will be explained. The integer byte-code is stored in the cache 2, and it is fetched to the fetch part 10 of the central processing unit 4 using the instruction bus I_BUS. The central processing unit 4 feeds the byte-code BTCODE to the byte-code accelerator 6. The byte-code accelerator 6 translates it into a native code INST in a translation table part (TRS_TBL) 30 and outputs it to the central processing unit 4. The central processing unit 4 decodes the instruction in the decoder part 12, subsequently executes the instruction in the instruction execution part 13, and outputs its result to the register file 15 or the data bus D_BUS. In a part of the register file 15, the upper element of the operand stack of Java is cached. At the time of the completion of operation of the byte-code accelerator 6, for example, when an unsupported byte-code that the hardware does not execute or a Java runtime exception is detected, the operand stack on the register file 15 is saved in the memory 3, and, subsequently, the CPU 4 branches to the software virtual machine, i.e., the software VM program.

Next, an operation for execution of the floating-point byte-code by the microprocessor 1 will be described. As with the integer byte-code, the floating-point byte-code is stored in the cache 2, and it is fetched to the fetch part 10 of the central processing unit 4 using the instruction bus I_BUS. The central processing unit 4 feeds the byte-code BTCODE to the byte-code accelerator 6. The byte-code accelerator 6 translates the byte-code BTCODE into a native code INST that includes a transfer instruction between the central processing unit 4 and the floating-point processing units 5 and an FPU operation instruction in the translation table part 30, and it outputs it to the central processing unit 4.

Figures 3, 4:
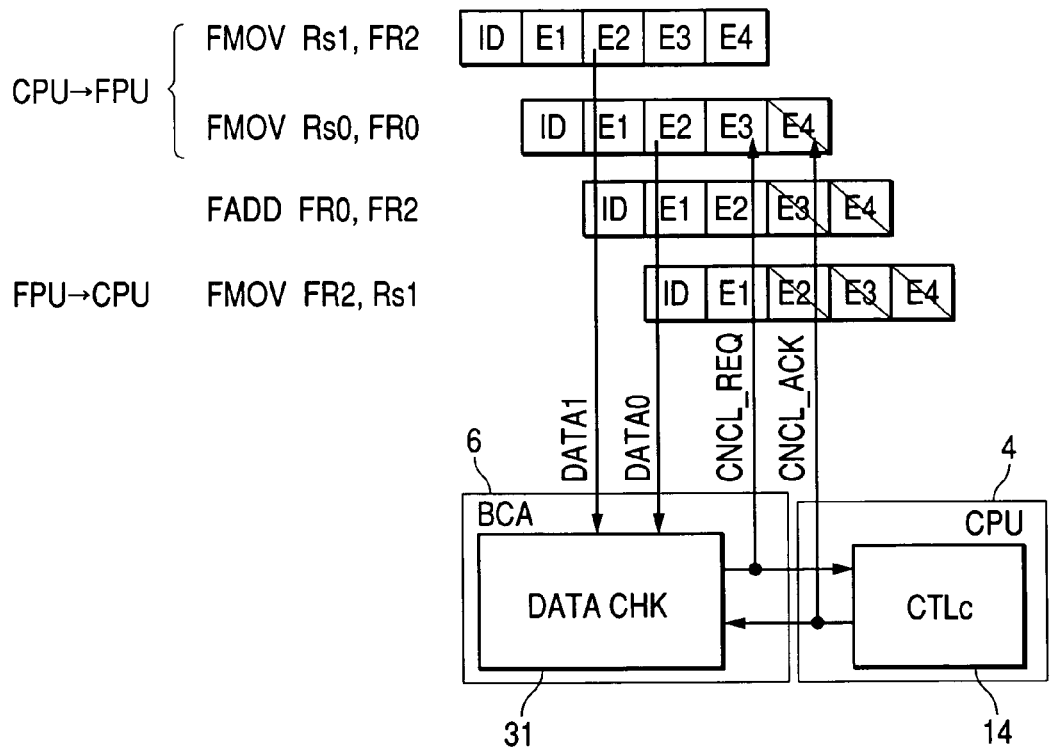
FIG. 3 is block diagram illustrating an example in which a fadd (floating-point add instruction) byte-code is translated into a native instruction, and showing both an input data check and cancel timing of the fadd byte-code.
FIG. 4 is a diagram showing single precision (Single) data of Not-a-Numbers (NaNs) and denormalized numbers (DENORMs) as data that must be checked in the data check part (DATA_CHK)

For example, FIG. 3 shows an example in which a byte-code in the form of a fadd (floating-point addition instruction) is translated into a native code. The first two instructions are instructions FMOV for transferring input data from the central processing unit 4 to the floating-point processing unit 5, the next single instruction is the floating-point addition instruction FADD, and the last single instruction is an instruction FMOV for transferring the result from the floating-point processing unit 5 to the central processing unit 4.

In the central processing unit 4, the decoder part 12 decodes a native code and generates a control signal necessary for the instruction. Similarly, in the floating-point processing unit 5, the decoder part 20 decodes the floating-point instruction and generates a control signal necessary for the instruction. The native code into which the floating-point byte-code was translated is executed as follows. First, the input data is read from the register file 15 of the central processing unit 4, the read data is transferred using the data transfer bus DATA_XFER between the central processing unit 4 and the floating-point processing unit 5, and the read data is written in the register file 23 of the floating-point processing unit 5. Next, a floating-point operation is performed in an execution part 21 of the floating-point processing unit 5, and an operation result is written in the register file 23. Finally, reading the register file 23 of the floating-point processing unit 5, the read data is transferred to the central processing unit 4 using the data transfer bus DATA_XFER, and, subsequently, it is written in the register file 15 of the central processing unit 4.

The cache of the operand stack exists only in the register file 15 of the central processing unit 4, and a register of the floating-point processing unit 5 is for temporal use, i.e., it is used as a temporary register. This is for making management of the stack on the register easy. This scheme not only simplifies the logic of stack management. In the microprocessor without the floating-point processing unit 5, the scheme only requires that the floating-point byte-code is specified as an unsupported code with the help of a control register for setting it to be capable of supporting the execution of the byte-code with hardware or not; therefore, it has also the advantage of eliminating a need for logic change of the stack management. Therefore, in order to transfer the data of the operand stack to the floating-point processing unit 5, data transfer is needed between the register of the central processing unit 4 and that of the floating-point processing unit 5.

In transferring the input data from the central processing unit 4 to the floating-point processing unit 5 using the data transfer bus DATA_XFER, the byte-code accelerator 6 snoops the data transfer bus to check the input data. The need for this will be explained.

First, as a matter of language regulation, Java is specified neither to signal the exception condition, such as invalid operations, zero division, overflow, underflow, inaccuracy, nor to signal a value of a NaN, but to give a single default value to an operation result on the occurrence of these events. For example, the result of divide by zero outputs signed infinity. A NaN generated by the operation is a default value of qNaN. For example, it is 7FBFFFFF in single precision and 7FF7FFFF FFFFFFFF in double precision. Then, in the case where data that can satisfy the above-mentioned exception condition is calculated using the floating-point processing unit 5, a floating-point operation shall be performed with FPU exception disable (inhibition of exception acceptance). At this time, the FPU exception does not occur. However, regarding NaNs, a method whereby the programmer distinguishes a difference of a NaN value with the use of Java is prepared, and, consequently, it is desirable to process a floating-point operation whose input is a NaN on the software virtual machine. For this purpose, when data that can satisfy the above NaN data is inputted, it is recommended to transfer the data to the software virtual machine.

Note that in processing denormalized number data, hardware for processing a denormalized number becomes necessary. In the case where the floating-point processing unit 5 has no denormalized number processing hardware, an FPU exception always occurs when the demoralized number is inputted, because of incapability of operations. Therefore, in executing the operation again with the exception handler, it is necessary to set a flag, and the central processing unit 6 must branch to a floating-point math library of the software according to a value of the flag after the return from the exception handler. In order to branch to a floating-point math library of the software, it is necessary to deactivate the byte-code accelerator and to assign the processing to the software virtual machine. In order to perform these processes at high speed, means for being detected by the byte-code accelerator before the occurrence of an FPU exception is adopted, rather than a method of setting a flag with the exception handler after the occurrence of an FPU exception. That is, the byte-code accelerator checks the input data before the operation starts, and if the input data is a denormalized number, its floating-point byte-code has only to be processed on the software virtual machine as an unsupported byte-code.

From the foregoing, in transferring the input data from the central processing unit 4 to the floating-point processing unit 5 using the data transfer bus DATA_XFER, the byte-code accelerator 6 snoops the data transfer bus to check the input data, and, consequently, branching to the exception handler due to an FPU exception does not occur in the floating-point processing unit 5. Therefore, the device according to this invention has the following advantages capability of fast movement to the software virtual machine, and elimination of the necessity of modifying the existing exception handler.

FIG. 4 and FIG. 5 show an example of the data that should be checked in the data check part (DATA_CHK) 31. FIG. 4 shows single precision (Single) data of Not-a-Numbers (NaNs) and denormalized numbers (DENORMs), and FIG. 5 shows double precision (Double) data for the same. A floating-point processing unit 5 that is incapable of handling denormalized numbers is assumed. The data check part 31 has only to check whether the input data is a NaN or DENORM, with a 32-bit comparator, when the data transfer bus DATA_XFER has a 32-bit width, and with a 64-bit comparator, when the data transfer bus DATA_XFER has a 64-bit width.

FIG. 6 shows processing on operands of the floating-point instruction FADD with FPU exception enable using a matrix, and FIG. 7 shows processing on operands of the floating-point instruction FADD with FPU exception disable using a matrix. When using the byte-code accelerator, a floating-point operation is processed always with FPU exception disable. The designation+INF means+infinity and the designation−INF means−infinity. At the time of (+INF)+(−INF), with the FPU exception enable of FIG. 6, an FPU invalid operation exception (Invalid) occurs, and the floating-point operation using the byte-code accelerator 6 of FIG. 7 yields an operation result of qNaN. When the input is a NaN, any byte-code including the instruction FADD is treated as an unsupported byte-code in the byte-code accelerator 6. With respect to the denormalized number (DENORM), the propriety of hardware processing may differ for each instruction. That is, since a circuit for realizing an operation of denormalized number data varies depending on the kind of operation, providing circuits for realizing denormalized number data for all operations brings about an increase in the circuit area and is not practical. However, for a part of the operations (for example, addition), it is also effective to provide a circuit for realizing the operation of denormalized number data, thereby achieving a higher speed of operation. Here, it is assumed that hardware processing is possible for the addition of denormalized numbers.

An operation in which the data on the transfer bus DATA_XFER is a NaN will be described. Since the NaN data is inputted into the data check part 31 of the byte-code accelerator 6 and agreement is obtained in the comparator for the NaN data, a cancel request signal (CNCL_REQ) is outputted to the central processing unit 4. The cancel request signal undergoes a priority check, together with other interrupts and exception information, in the control part 14 in the central processing unit 4. When it is accepted by the central processing unit 4, the central processing unit 4 outputs the cancel signal (CNCL) with a cancel acknowledge signal (CNCL_ACK) to the byte-code accelerator 6 and the floating-point processing unit 5, inhibiting execution of the floating-point operation code (FPU instruction) on and after the data transfer instruction. Then, in order that the byte-code accelerator 6 handles the byte-code on which a cancel has been requested as an unsupported byte-code, the byte-code accelerator 6 outputs a completion sequence instruction for an unsupported byte-code to the central processing unit 4 and completes processing; then, the central processing unit 4 branches to the software virtual machine by the software VM program.

Referring to FIG. 3, the input data check and cancel timing of a fadd byte-code will be described. ID designates a decoding stage; E1 through E4 designate execution stages. Here, Rs0 and Rs1 designate the top and the next element of the operand stack on the register, respectively. FR0 and FR2 designate registers of the floating-point processing unit 5. In the first instructions, FMOV Rs1, FR2 and FMOV Rs0, FR0, data DATA1, DATA0 on the data transfer bus DATA_XFER are inputted into registers FR2, FR0 at the E2 stage. In the data check part (DATA_CHK) 31 in the byte-code accelerator 6, when the data on the data transfer bus (DATA_XFER) coincides with either a Not-a-Number (NaN) or a denormalized number (DENORM) at the E2 stage, a cancel request signal (CNCL_REQ) is asserted to the central processing unit 4 at the E3 stage of the second instruction. The data that should be checked in the data check part 31 may differ according to the kind of FPU instruction. In performing a priority check of an exception in the control part 14 of the central processing unit 4 and accepting the cancel signal, the cancel acknowledge signal (CNCL_ACL) and the cancel signal (CNL) are asserted at the E4 stage of the second instruction. Then, at the second instruction and thereafter, execution of continuing instructions will be cancelled. Since the FADD instruction is also canceled, an FPU exception does not occur. This is because the acceptance of an FPU exception is conducted at the E4 stage of the third instruction.

Here processing of the central processing unit 4 that has accepted the cancel signal and the byte-code accelerator 6 will be described. When the byte-code accelerator 6 has accepted the cancel acknowledge signal (CNCL_ACK) and the cancel signal (CNCL), it provides an instruction stream of an unsupported sequence in order to complete the byte-code accelerator 6. When it has accepted the cancel acknowledge signal (CNCL_ACK), the byte-code accelerator 6 may be translating another byte-code. However, the byte-code accelerator 6 can know correctly the byte-code that has requested a cancel by using a location of the byte-code of the E4 stage of the second instruction of FIG. 3, namely a value of JavaPC. FIG. 3 shows an example in which the cancel acknowledge signal is accepted during execution of the fadd byte-code. When the central processing unit 4 executes the instruction stream of the unsupported sequence, the central processing unit 4 will branch to the software virtual machine, and the byte-code accelerator 6 deactivates processing.

In arbitrary instructions, in order to make it possible to know arbitrary stage propagation information of the central processing unit 4, the byte-code accelerator 6 has the simulated pipeline part (PL_SIM) 32. Snooping the data on the data transfer bus DATA_XFER at the E2 stage of the second instruction described above and knowing the byte-code at the E4 stage of the second instruction are realized by using the simulated pipeline part 32. Here, the unsupported sequence includes a native code sequence for saving the operand stack on the register in memory and branching to the software virtual machine for the purpose of performing software processing.

Figure 8:
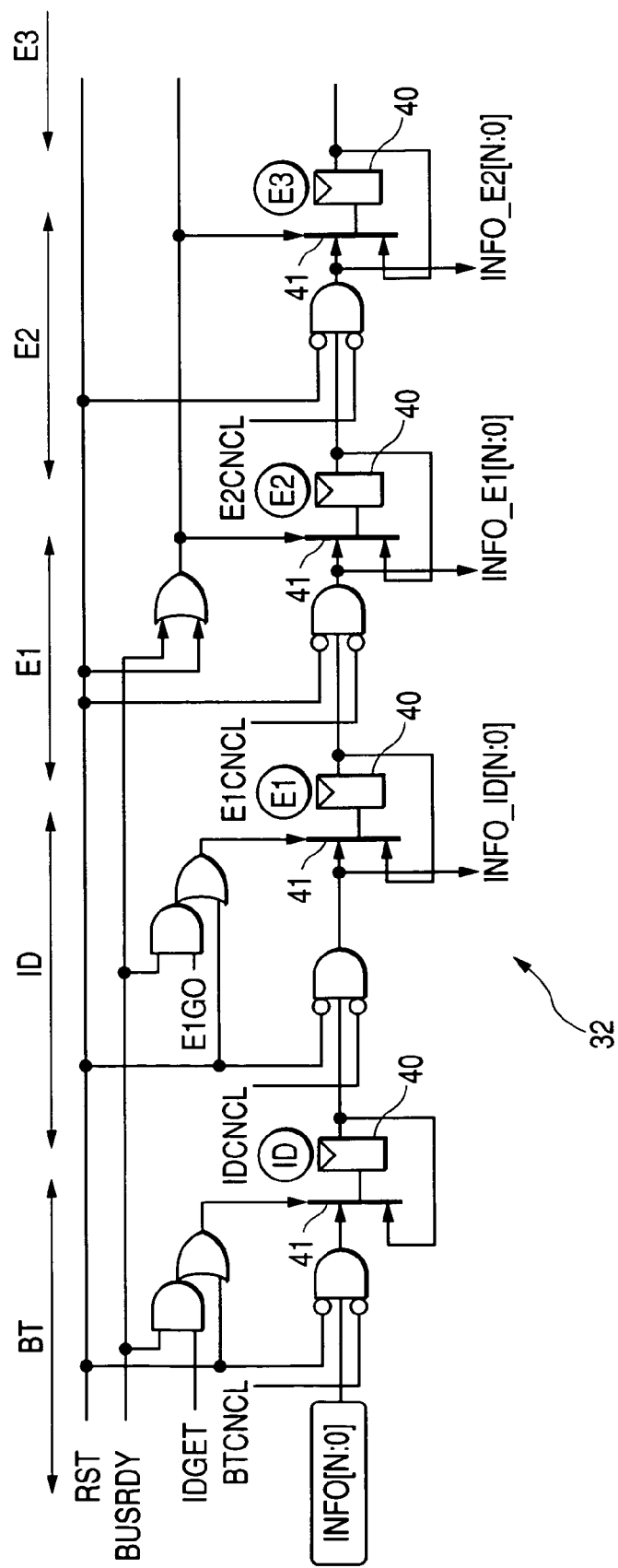
FIG. 8 is a schematic circuit diagram illustrating the configuration of a simulated pipeline of the byte-code accelerator.

FIG. 8 shows an example of the simulated pipeline (PL_SIM) 32 of the byte-code accelerator 6. BT designates an operation stage of the byte-code accelerator 6, ID designates a decoding stage, and the E1 stage and steps thereafter are execution stages. Since the composition after the E3 stage is the same as that of the preceding stage, illustration thereof is omitted. N+1 bit information shown by INFO [N:0] is flag information correlated with a native instruction to be executed by the CPU. The simulated pipeline part has a shift register configuration in which flag information is shifted to subsequent stages in response to transition of the pipeline stage of the CPU 4, and it has a (N+1) shift registers corresponding to INF [N:0]. Each storage stage of the shift register is constructed with a flip-flop 40. The selector 41 placed at the preceding stage of the flip-flop 40 selects a feedback loop and keeps a state until the -pipeline stage makes a transition. The selector 41 selects input from the preceding stage at the time of transition and reset of the pipeline stage. An instruction is issued at the ID stage, and at the E1 stage and thereafter the stage makes a transition in synchronization with a bus ready signal BUSRDY of the cache. Transition from the ID stage to the E1 stage is controlled using an instruction issue signal E 1GO and the bus ready signal BUSRDY of the central processing unit 4. In order to make a transition signal of the BT stage operate in synchronization with the ID stage, the instruction acknowledge signal IDGET and the bus ready signal BUSRDY are used. N+1 bit information INFO [N:0] required to operate the byte-code accelerator BCA at each stage is carried in synchronization with the transition of the stage. INFO_ID [N:0], INFO_E1 [N:0], INFO_E2 [N:0], etc. are referred to and used internally. For the information on each stage, NOT and AND of the cancel signal CNCL of each stage, such as IDCNCL and E1CNCL, are taken. Thereby, when the cancel signal is asserted by the central processing unit 4, the inputs of latch stages will be set to a logical value "0". As an example of information carried among stages, there are data transfer information from the central processing unit 4 to the floating-point processing unit 5, register management information of the operand stack, etc. E3 and E4 stages can be constructed as with the E2 stage.

As described above, when the floating-point processing unit 5 is used, the byte-code accelerator 6 snoops data on the data transfer bus DATA_XFER from the central processing unit 4 to the floating-point processing unit 5, and it conducts a data check, whereby the byte-code accelerator 6 can detect precisely data for which a floating math library must be called. After that, the byte-code accelerator 6 judges the said floating-point byte-code to be an unsupported byte-code and the central processing unit 4 branches to the software virtual machine. Regarding data that might cause an FPU exception, for example, when a denormalized number is inputted into the floating-point processing unit 5 that does not have processing hardware for denormalized numbers, before an FPU exception occurs, a byte-code corresponding to it is specified to be an unsupported byte-code and then the central processing unit 4 branches to the software virtual machine (software VM program). Then, in performing interpreter processing of the floating-point byte-code with the software virtual machine, a floating-point math library is called and the floating-point operation is emulated with software.

Figure 9:
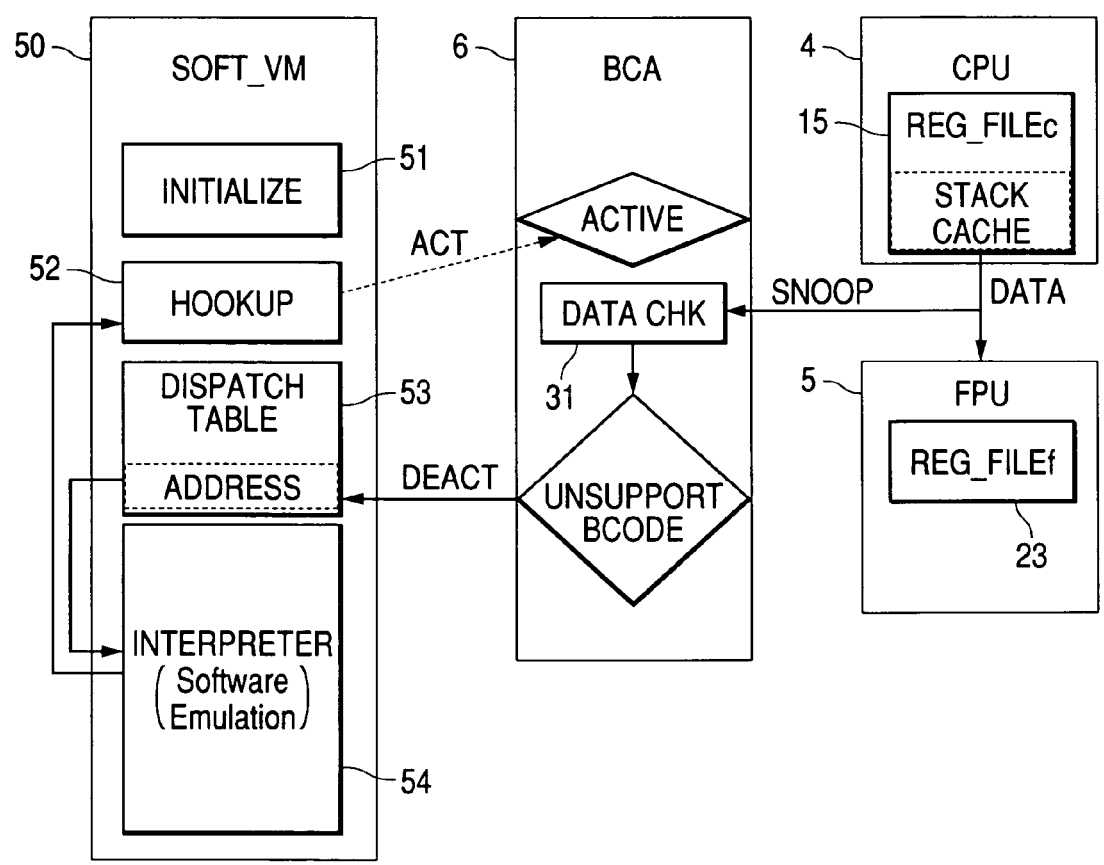
FIG. 9 is a block diagram showing the operation and transition between the byte-code accelerator and a software virtual machine at the time of execution of the floating-point byte-code.

The byte-code accelerator 6 executes a byte-code with hardware, and it constitutes a virtual machine in cooperation with another part of the implementation by software. This part of the implementation by software is the software virtual machine (SOFT_VM). FIG. 9 shows load sharing of operations by the byte-code accelerator 6 and the software virtual machine and transition between the two when the floating-point byte-code is executed.

The software virtual machine (SOFT_VM) 50 is composed of: an initializing part (INITIALIZE) 51 for initializing execution of the software VM; a hookup part (HOOKUP) 52 at which a boot instruction (J_JP instruction) used to start the byte-code accelerator 6 is placed; a dispatch table (DISPATCH TABLE) 53 for indicating a starting address of the interpreter processing of each byte-code; and an interpreter part (INTERPRETER) 54 that executes interpretation with software. The central processing unit 4, the floating-point processing unit 5, and the byte-code accelerator 6 are just as explained above.

An operation will be described for the case where the input data, for example, is a Not-a-Number (NaN) and a floating-point math library is called in the processing of the floating-point byte-code.

The FPU input data (DATA) is outputted to the floating-point register (FREG_FILE) 23 from the operand stack of the general-purpose register (GREG_FILE) 15 of the central processing unit 4 via the data bus. The byte-code accelerator 6 snoops (SNOOP) data (DATA) on the data bus and inputs it into the data check part (DATA_CHK) 31 of the byte-code accelerator 6. When the data check part 31 detects a Not-a-Number (NaN), the byte-code accelerator recognizes the byte-code including the floating-point operation as an unsupported byte-code (UNSUPPORT BCODE). There is exchange of signals among the byte-code accelerator 6, the central processing unit 4, and the floating-point processing unit 5, which is omitted here because it is similar to that described with reference to FIG. 1. The byte-code accelerator 6 completes processing after outputting a sequence of native instructions, at the time of an unsupported byte-code, to the central processing unit 4. Further, although it is omitted in the figure, the program counter is set at the dispatch table address of the software virtual machine for the byte-code, and the byte-code accelerator deactivates processing (DEACT).

At the time of an unsupported byte-code, a start address (ADDRESS) of the interpreter 54 is given by the the dispatch table (DISPATCH TABLE) 53, and interpretation is executed in the interpreter part (INTERPRETER) 54. The dispatch table part 53 is composed of 256 arrays, which is equal to the number of all 8-bit byte-codes. The interpreter part performs a data check. Since the input data is a Not-a-Number, a floating-point math library is called, and the floating-point byte-code is emulated with software.

The hookup part 52 is a software routine in which the boot instruction, that should be executed by the software in starting the byte-code accelerator 6, is placed. After the unsupported byte-code is executed through the interpreter part 54, the software virtual machine branches to the hookup part 52, and, subsequently, the byte-code accelerator 6 is started again to process the next byte-code. Here, the hookup part is not limited to one; and, two or more hookup parts 52 may exist. For example, to effect a speedy return after processing of the unsupported byte-code, the boot instruction (J_JP instruction) may be placed at the ends of byte-code processing parts both of the interpreter part of the software VM and of the interpreter.

Moreover, when it is used for a portable terminal, etc., it is necessary to reduce the power consumption. In that case, it is conceivable to achieve a lower power consumption in a chip equipped with the coprocessor (for example, FPU) by setting the status register of the central processing unit (CPU) in a FPU unequipped mode and deactivating the coprocessor. In the case of setting the FPU unequipped mode in this way, processing when the floating-point byte-code is executed using the byte-code accelerator will be described. The byte-code accelerator feeds a floating-point instruction to the CPU. At this time, the CPU generates a coprocessor (e.g., FPU) invalid exception, and it communicates this to the byte-code accelerator. Before the CPU branches to the exception handler, the byte-code accelerator sets the program counter at an address of the starting instruction, and completes processing. Within the exception handler, the CPU sets a status register to a coprocessor equipped mode, and it returns to the normal mode. Since the address of the return destination is the boot instruction of the byte-code accelerator at this time, the byte-code accelerator can return from the byte-code. The address of the byte-code (JavaPC) is provided by the argument of the register value of the boot instruction.

With the microprocessor 1, the following action effects can be acquired. The byte-code accelerator 6 can execute a floating-point byte-code in conjunction with the central processing unit (CPU) 4 as a main processor and the floating-point processing unit (FPU) 5 as a coprocessor. At this time, the microprocessor can detect an exception event of the coprocessor 5, for example, the floating-point data (NaN, denormalized number, etc.) that needs a call of a floating-point math library, at high speed and precisely—here, the floating-point byte-code—and branch to the software virtual machine. If arithmetic processing of a denormalized number is executed by the floating-point processing unit 5 with no denormalized number processing hardware, an FPU exception will be generated and normally the floating-point processing unit 5 will branch to the exception handler. However, with the above-mentioned configuration, since the FPU exception does not occur, a change of the exception handler is unnecessary. This means that the exception handlers in the existing software resources are usable; and the exception handlers of existing software resources can also be inherited with the addition of the byte-code accelerator 6.

Figure 10:
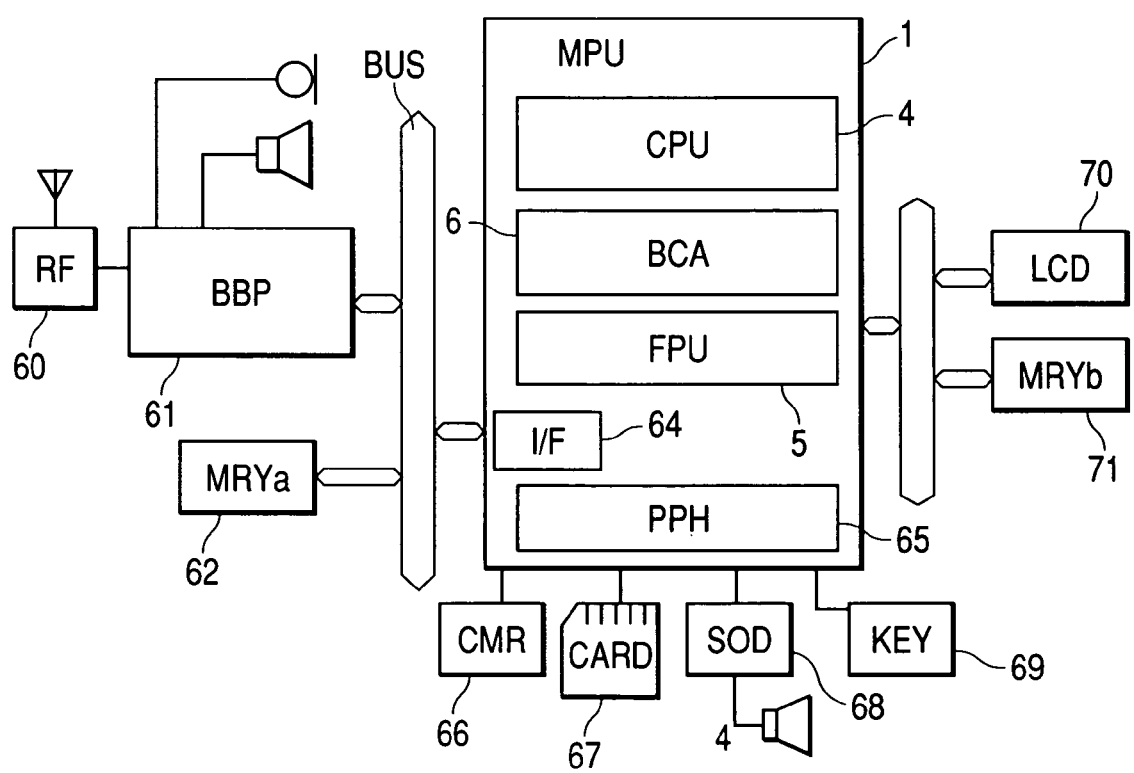
FIG. 10 is a block diagram showing one example of a portable information system representing a suitable application of the microprocessor of FIG. 1.

FIG. 10 shows one example of a portable information system which represents a suitable application of the microprocessor. A cellular-phone system is roughly divided into two constituents: a communication part and an application part. The communication part has a radio frequency part (RF) 60 for transmitting and receiving radio waves with an antenna, a baseband processor (BBP) 61 for acting as a baseband modem and codec, and a memory (MRYa) 62. The application part consists mainly of the microprocessor 1 having the byte-code accelerator 6, the central processing unit 4, and the floating-point processing unit 5 in it. To the microprocessor 1, the following are connected: a baseband processor 6 is connected an interface (I/F) 64 via a bus BUS; a camera (CMR) 66, a memory card (CARD) 67, a sound source part (SOD) 68 and a keyboard (KEY) 69 are connected through a peripheral interface (PPH) 65; and a liquid crystal display (LCD) 70 and memory (MRYb) 71 are connected via an external bus. Although this example of a system configuration is applicable to cellular phones, examples of various system configurations, such as a personal digital assistant and a digital camera, are conceivable.

In this example of a system configuration, for example, the memory is used as follows. A Java application is distributed from an external server through the radio frequency part RF, uses the baseband processor 61, and is stored in the memory 62. The software virtual machine 50 may be placed on either the memory 62 or the memory 71. The Java application stored in the memory 62 is transferred to the memory 71 and is executed by the microprocessor 1. A software virtual machine 50 is placed in the memory 71. Since the interpreter part 54 of the software virtual machine 50 has a high frequency of access, it is desirable that the interpreter part 54 is placed on the internal memory of the microprocessor (MPU) 1 that is built into a semiconductor integrated circuit. Since this system enables a byte-code to be processed at high speed, the added value of a portable information system can be enhanced.

Figure 11:
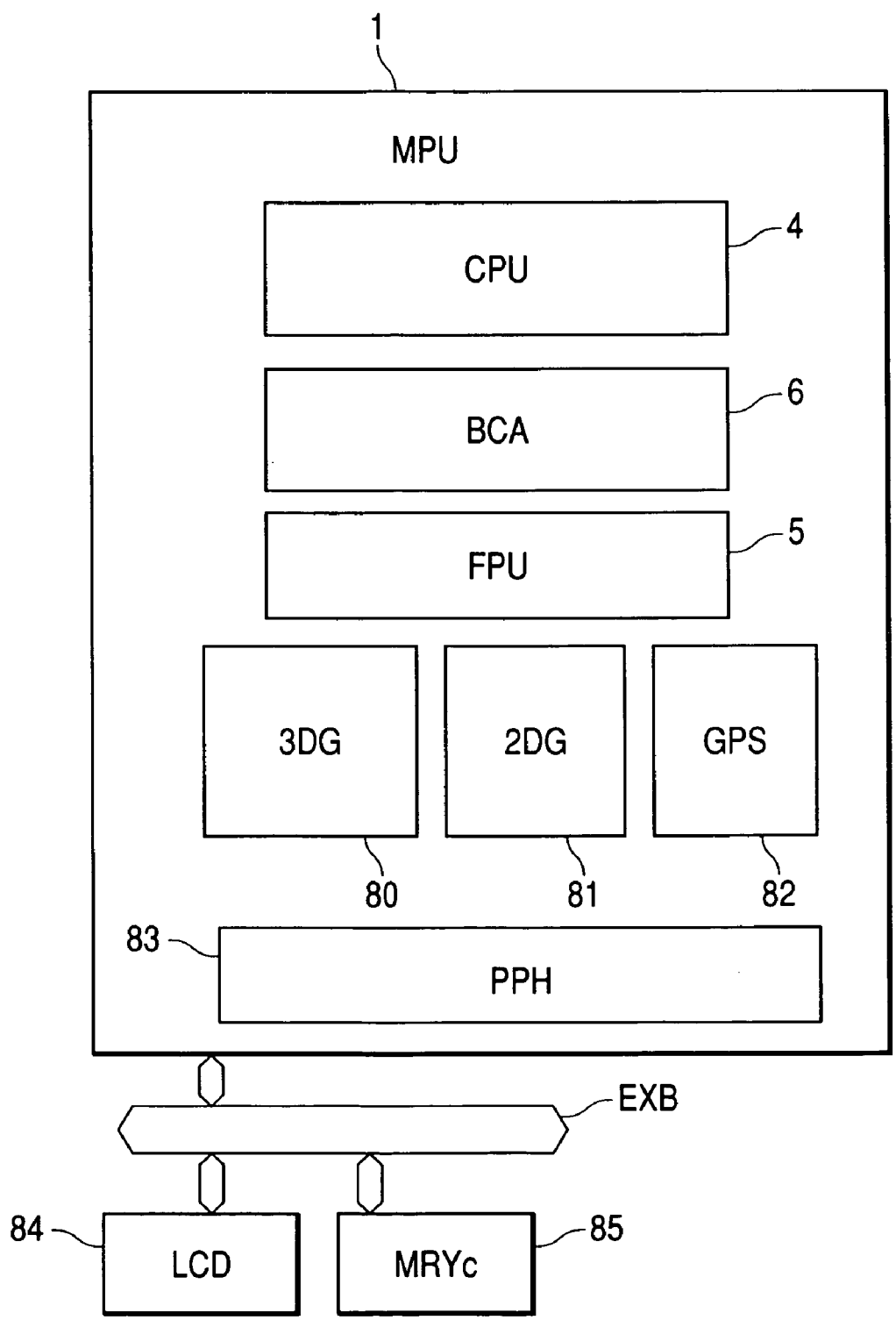
FIG. 11 is a block diagram illustrating the configuration of an in-vehicle information system, e.g., car navigation system, representing a suitable application of the microprocessor of FIG. 1.

FIG. 11 illustrates the configuration of an in-vehicle information system, e.g., a car navigation system, as a suitable application of the microprocessor. A three-dimensional graphics accelerator (3DG) 80, a two-dimensional graphics accelerator (2DG) 81, a global positioning system (GPS) 82, and a peripheral interface (PPH) 83 are integrated in the microprocessor (MPU) 1, which is equipped with the central processing unit 4, the floating-point processing unit 5, and the byte-code accelerator 6. A liquid crystal display (LCD) 84 and a memory (MRYc) 85 are connected to this via an external bus EXB.

In this example of a system configuration, the Java application and the software virtual machine 50 are stored in the memory (MRYc) 85. Since the interpreter part 54 of the software virtual machine 50 has a high frequency of access, it is desirable that the interpreter part 54 is placed on the on-chip memory of the microprocessor that is built into a semiconductor integrated circuit. By this configuration, a byte-code can be processed at high speed, and, consequently, the added value of the in-vehicle information system can be enhanced.

Figure 12:
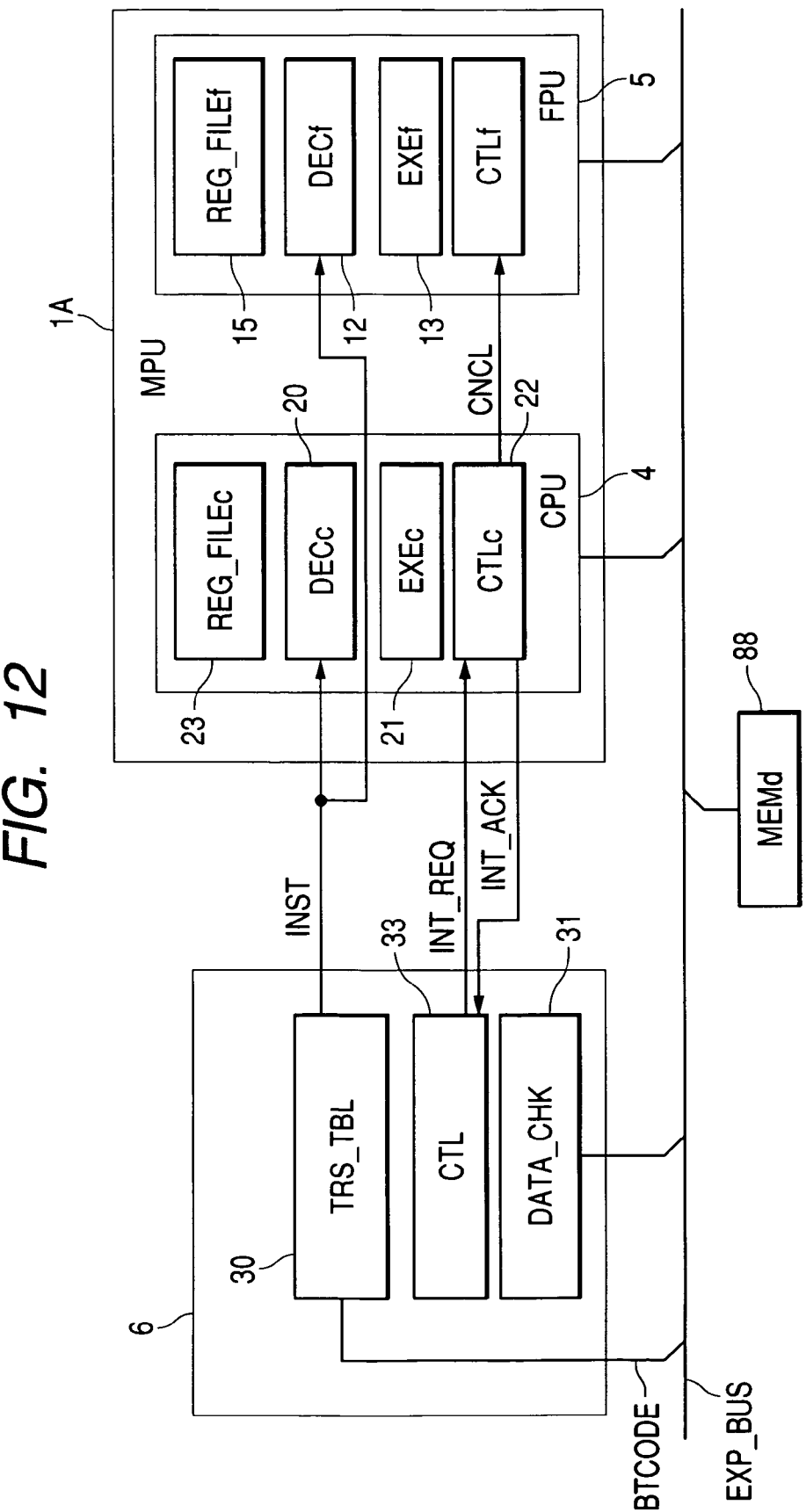
FIG. 12 is a block diagram showing an example of a data processing device in which the byte-code accelerator is constructed in a chip different from that of the microprocessor.

FIG. 12 shows another example of the microprocessor. The information processing device shown in this figure differs from that of FIG. 1 in the point that the byte-code accelerator 6 is constructed in a chip different from that of the microprocessor (MPU) 1A. Since the device is constructed to have a multichip configuration, the configuration products the following differences. First, in processing a byte-code using the byte-code accelerator 6, the central processing unit 4 transfers the floating-point operation data using the memory (MEMd) 88. Although the invention is not limited in particular, the register file (REG_FILEf) 23 of the floating-point processing unit 5 is used as a temporary register. Second, when the data check circuit (DATA_CHK) 31 detects unsupported data of the floating-point processing unit 5, the control part (CTL) 33 of the byte-code accelerator 6 makes an interrupt request to the central processing unit 4 by an special interrupt signal INT_REQ, requesting transfer to processing by the software VM program 50. The byte-code accelerator 6 confirms acceptance of the interrupt request by an interrupt acknowledge signal INT_ACK, and, subsequently, it deactivates the operation. With the microprocessor supporting a multi-chip configuration, by connecting the byte-code accelerator 6 to an existing MPU having the central processing unit 4 and the floating-point processing unit 5 externally, a situation in which an exception occurs in the floating-point processing unit 5 in the processing of the byte-code accelerator 6 can be inhibited as with the microprocessor 1 of FIG. 1.

Figure 13:
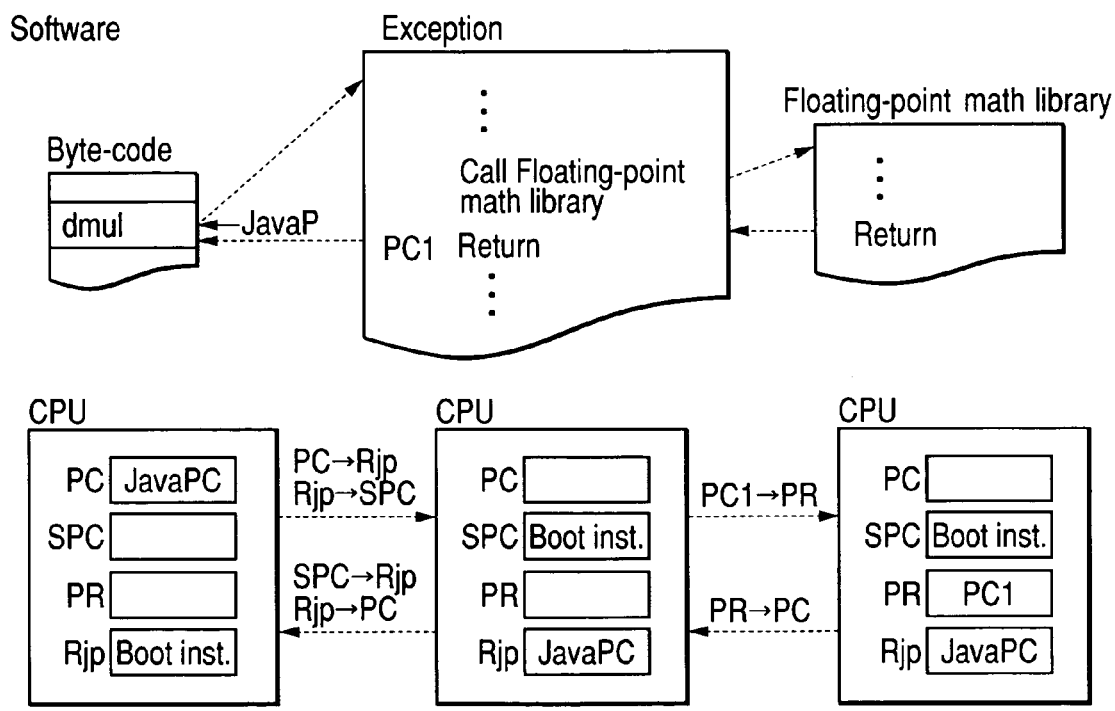
FIG. 13 is a diagram which shows an example of calling a floating-point library from the exception handler.

FIG. 13 shows another embodiment of this invention. The description so far presented has been directed to examples in which the floating-point math library is called from the software virtual machine. In this example, the floating-point math library is called from the exception handler. It is assumed that there is no denormalized number processing hardware for double precision floating-point multiplication. At this time, the figure shows an example in which an FPU exception has occurred when software includes a dmu 1 byte-code and the input is a denormalized number. When the FPU exception occurs, the exception handler is raised. Then, a floating-point math library is called in the exception handler, appropriate processing is executed, and the process returns.

CPU hardware is realized by using one register Rjp among the general-purpose registers, a retention program counter SPC as a program counter for saving exceptions, and a PR register as a program counter for saving subroutines. First, when an FPU exception occurs, an address of a boot instruction, as a return address to a byte-code sequence, is stored in the SPC. And, JavaPC is stored in the register Rjp. Next, when the floating-point math library is called, PC1 is stored in the register PR as a return address to the exception handler. When returning from the library arithmetic function, the process returns to the exception handler properly by storing a value of the PR register in the PC. When returning from the exception handler, the process returns from the address of the starting instruction by storing a value of the program counter SPC for saving exceptions in the PC. By referring to the register Rjp as the JavaPC at that time, the process can return correctly.

In the foregoing, the invention devised by the present inventors has been described concretely based on various embodiments, but it goes without saying that this invention is not limited to these embodiments, and it can be modified without departing from the scope and spirit of the invention.

For example, the coprocessor, which is typified by an FPU, is not limited to an FPU. For example, the coprocessor may be a digital signal processing processor or a cryptogram arithmetic processor. Moreover, examples suitable for Java language specification intended for built-in equipment were explained, but the information processing device is permitted to support other Java language specifications. Furthermore, virtual machine instructions are not limited to codes generated by Java language, and they may be instructions that depend on another language specification for generating codes independent of the architecture of the processor.

In the above description, effects that are obtained by some typical examples of the invention disclosed by the present application can be described as follows.

That is, by using a register of the coprocessor, such as an FPU, assuming it serves as a temporary register, management of the operand stack for the main processor with CPU and the coprocessor, such as an FPU, can be simplified.

Since operation-unsupported data is detected directly, for an arithmetic operation that the coprocessor, such as an FPU, cannot handle, the byte-code accelerator (BCA) 6 can detect the arithmetic operation that the coprocessor cannot handle precisely Since the operation-unsupported data is detected directly and its operation is inhibited, even for software processing of the arithmetic operation that the coprocessor, such as an FPU, cannot handle, the exiting exception handler can be used without modifying it.

By the above-mentioned operations, in a data processing device that has both an accelerator capable of translating a virtual machine instruction into a native instruction and a coprocessor, the execution efficiency of the virtual machine instruction can be improved.

What is claimed is:

1. An information processing device, comprising:
a main processor including general purpose registers to store an operand stack;
a coprocessor including floating point registers to store temporary data;
a data bus to transfer the operand data between the general purpose registers and the floating point registers; and
an accelerator configured to translate a byte code into a native code,
wherein the byte code comprises virtual machine instructions independent of an architecture of the main processor;
wherein the native code comprises translated native instructions dependent on the architecture of the main processor,
wherein the translated native instructions include a first instruction for transferring data from the main processor to the coprocessor, an arithmetic instruction to be executed by the coprocessor, and a second instruction for transferring data from the coprocessor to the main processor,
wherein the accelerator is configured to snoop the operand data being transferred via the data bus by executing the first instruction for transferring data from the main processor to the coprocessor and to detect whether or not the operand data inputted into the coprocessor is unsupported data of the coprocessor before the coprocessor executes the arithmetic instruction, and
wherein the accelerator is configured to detect the unsupported data of the coprocessor and to signal such detection to the main processor before execution of the unsupported data by the coprocessor so that the occurrence of an exception is prevented in the coprocessor, wherein the accelerator is configured to detect the operation unsupported data in a time period before the coprocessor can detect an exception, and wherein detection of the unsupported data of the coprocessor is done without the use of an exception handler.

2. The information processing device according to claim 1, wherein the main processor is a central processing unit; and wherein the coprocessor is a floating point processing unit.

3. The information processing device according to claim 1, wherein the accelerator is configured to show agreement with a predetermined numeric value in a time period before the coprocessor can detect an exception.

4. The information processing device according to claim 2, wherein the operation unsupported data is either one of a denormalized number or not-a-number.

5. An information processing device, comprising:

a main processor including general purpose registers to store an operand stack;

a coprocessor including floating point registers to store temporary data ;

a data bus to transfer the operand data between the general purpose registers and the floating point registers; and an accelerator configured to translate a byte code into a native code, wherein the byte code comprises virtual machine instructions independent of an architecture of the main processor;

wherein the native code comprises translated native instructions dependent on the architecture of the main processor, wherein the translated native instructions include a first instruction for transferring data from the main processor to the coprocessor, an arithmetic instruction to be executed by the coprocessor, and a second instruction for transferring data from the coprocessor to the main processor, wherein the information processing device further comprises means for inhibiting the coprocessor from executing unsupported data, said inhibiting means including means in the accelerator for snooping the operand data being transferred via the data bus by executing the first instruction for transferring data from the main processor to the coprocessor and for detecting whether or not the operand data inputted into the coprocessor is unsupported data of the coprocessor before the coprocessor executes the arithmetic instruction, and wherein the accelerator further includes means for detecting the unsupported data of the coprocessor and for signaling such detection to the main processor before execution of the unsupported data by the coprocessor so that the occurrence of an exception is prevented in the coprocessor, and wherein the accelerator is configured to detect the operation unsupported data in a time period before the coprocessor can detect an exception, and wherein detection of the unsupported data of the coprocessor is done without the use of an exception handler.

6. The information processing device according to claim 5, wherein the main processor is a central processing unit; and wherein the coprocessor is a floating point processing unit.

7. The information processing device according to claim 5, wherein the accelerator further includes means for showing agreement with a predetermined numeric value in a time period before the coprocessor can detect an exception.

8. The information processing device according to claim 6, wherein the operation unsupported data is either one of a denormalized number or not-a-number.

* * * * *